(12) United States Patent
Matteo

(10) Patent No.: US 7,854,902 B2
(45) Date of Patent: Dec. 21, 2010

(54) MODULAR AND RECONFIGURABLE MULTI-STAGE HIGH TEMPERATURE MICROREACTOR CARTRIDGE APPARATUS AND SYSTEM FOR USING SAME

(75) Inventor: Joseph C. Matteo, Louisville, TN (US)

(73) Assignee: NanoTek, LLC, Walland, TN (US)

( * ) Notice: Subject to any disclaimer, the term of this patent is extended or adjusted under 35 U.S.C. 154(b) by 559 days.

(21) Appl. No.: 11/843,458

(22) Filed: Aug. 22, 2007

(65) Prior Publication Data

US 2008/0181829 A1    Jul. 31, 2008

Related U.S. Application Data

(60) Provisional application No. 60/823,303, filed on Aug. 23, 2006.

(51) Int. Cl.
*B01J 10/00*    (2006.01)
(52) U.S. Cl. .................. 422/129; 422/159; 422/240
(58) Field of Classification Search .................. None
See application file for complete search history.

(56) References Cited

U.S. PATENT DOCUMENTS

| | | | |
|---|---|---|---|
| 4,670,404 A | 6/1987 | Swift et al. |
| 5,387,397 A | 2/1995 | Strauss et al. |
| 5,614,154 A | 3/1997 | Glatz et al. |
| 5,808,020 A | 9/1998 | Ferrieri et al. |
| 5,842,787 A | 12/1998 | Kopf-Sill et al. |
| 5,856,671 A | 1/1999 | Henion et al. |
| 5,858,187 A | 1/1999 | Ramsey et al. |
| 5,859,070 A | 1/1999 | Jackson |
| 5,921,678 A | 7/1999 | Desai et al. |
| 5,922,591 A | 7/1999 | Anderson et al. |
| 5,961,932 A | 10/1999 | Ghosh et al. |

(Continued)

FOREIGN PATENT DOCUMENTS

DE    102005025499    12/2006

(Continued)

OTHER PUBLICATIONS

J. Michael Ramsey, Chemistry and Chemical Analysis on Microfabricated Devices, Chemical and Analytical Sciences Division, Jan. 28, 2004, Oak Ridge, Tennessee.

(Continued)

*Primary Examiner*—In Suk Bullock
*Assistant Examiner*—Timothy G Kingan
(74) *Attorney, Agent, or Firm*—Fish & Richardson P.C.

(57) ABSTRACT

A microfluidic reactor cartridge having glass capillary tubing wound in a coil and surrounded by a ceramic housing capable use in high temperatures and method for using same. In another embodiment, the microfluidic cartridge is a serpentine reactor cartridge with a serpentine microreactor channel formed in a ceramic housing. The serpentine reactor cartridge has an inlet tube attached to its inlet port and an outlet tube attached to its outlet port. The inlet port is a macro/micro interface and the outlet port is a micro/macro interface useful in gas phase reactions where solids must be used to produce a reactant. The method for using a microfluidic reactor cartridge includes two phases, the first phase for producing a radioactive labeled gas such as methyl iodide and the second phase is a methylation reaction.

14 Claims, 8 Drawing Sheets

U.S. PATENT DOCUMENTS

| | | | |
|---|---|---|---|
| 5,965,092 | A | 10/1999 | Chatterjee et al. |
| 5,976,472 | A | 11/1999 | Chatterjee et al. |
| 6,001,229 | A | 12/1999 | Ramsey |
| 6,010,607 | A | 1/2000 | Ramsey |
| 6,033,546 | A | 3/2000 | Ramsey |
| 6,035,914 | A | 3/2000 | Ramsey |
| 6,036,927 | A | 3/2000 | Chatterjee |
| 6,062,261 | A | 5/2000 | Jacobson et al. |
| 6,106,710 | A | 8/2000 | Fischer et al. |
| 6,110,343 | A | 8/2000 | Ramsey et al. |
| 6,117,396 | A | 9/2000 | Demers |
| 6,120,666 | A | 9/2000 | Jacobson et al. |
| 6,139,734 | A | 10/2000 | Settlage et al. |
| 6,180,372 | B1 | 1/2001 | Franzen |
| 6,187,206 | B1 | 2/2001 | Bernier et al. |
| 6,231,737 | B1 | 5/2001 | Ramsey et al. |
| 6,235,471 | B1 | 5/2001 | Knapp et al. |
| 6,241,953 | B1 | 6/2001 | Krijgsman |
| 6,284,525 | B1 | 9/2001 | Mathies et al. |
| 6,315,905 | B1 | 11/2001 | Settlage et al. |
| 6,319,476 | B1 | 11/2001 | Victor, Jr. et al. |
| 6,342,142 | B1 | 1/2002 | Ramsey |
| 6,343,142 | B1 | 1/2002 | Tsutamori et al. |
| 6,376,181 | B2 | 4/2002 | Ramsey et al. |
| 6,409,072 | B1 | 6/2002 | Breuer et al. |
| 6,440,669 | B1 | 8/2002 | Bass et al. |
| 6,444,461 | B1 | 9/2002 | Knapp et al. |
| 6,475,363 | B1 | 11/2002 | Ramsey |
| 6,485,692 | B1 | 11/2002 | Freitag et al. |
| 6,524,456 | B1 | 2/2003 | Ramsey et al. |
| 6,537,506 | B1 | 3/2003 | Schwalbe et al. |
| 6,541,274 | B2 | 4/2003 | Nagle et al. |
| 6,572,830 | B1 | 6/2003 | Burdon et al. |
| 6,620,386 | B1 | 9/2003 | Welch |
| 6,632,656 | B1 | 10/2003 | Thomas et al. |
| 6,706,538 | B1 | 3/2004 | Karg et al. ............ 436/180 |
| 6,749,814 | B1 | 6/2004 | Bergh et al. |
| 6,806,087 | B2 | 10/2004 | Kibby et al. |
| 6,818,189 | B1 | 11/2004 | Adris et al. |
| 6,828,143 | B1 | 12/2004 | Bard |
| 6,858,435 | B2 | 2/2005 | Chervet et al. |
| 6,890,493 | B1 | 5/2005 | Bergh et al. |
| 6,896,855 | B1 | 5/2005 | Kohler et al. |
| 6,926,313 | B1 | 8/2005 | Renzi |
| 6,958,122 | B1 | 10/2005 | Gidner et al. |
| 6,977,064 | B1 | 12/2005 | Adris et al. |
| 7,182,371 | B1 | 2/2007 | Renzi |
| 7,244,961 | B2 | 7/2007 | Jovanovich et al. |
| 2004/0022696 | A1 | 2/2004 | Zigler et al. |
| 2004/0208794 | A1 | 10/2004 | Karg et al. ............ 422/100 |
| 2004/0258615 | A1 | 12/2004 | Buchanan et al. |
| 2005/0019213 | A1 | 1/2005 | Kechagia et al. |
| 2005/0052509 | A1 | 3/2005 | Gilligan et al. |
| 2005/0181519 | A1 | 8/2005 | Karg et al. ............ 436/180 |
| 2005/0221373 | A1 | 10/2005 | Enzelberger et al. |
| 2005/0226776 | A1 | 10/2005 | Brady et al. |
| 2005/0232387 | A1 | 10/2005 | Padgett et al. |
| 2005/0282206 | A1* | 12/2005 | Corbett et al. ............ 435/6 |
| 2006/0150385 | A1 | 7/2006 | Gilligan et al. |
| 2006/0283324 | A1* | 12/2006 | Roques ............ 96/101 |
| 2006/0289737 | A1 | 12/2006 | Bassmann et al. |
| 2007/0071664 | A1 | 3/2007 | Bellos et al. |

FOREIGN PATENT DOCUMENTS

| | | |
|---|---|---|
| JP | 9-263591 | 10/1997 |
| JP | 2000-249694 | 9/2000 |
| JP | 2005-065632 | 3/2005 |
| JP | 2005065632 | 3/2005 |
| PL | 0264094 | 9/1988 |
| WO | WO 99/67656 | 12/1999 |
| WO | WO 01/34660 | 5/2001 |
| WO | WO 02/11880 | 2/2002 |
| WO | WO 03/002157 | 1/2003 |
| WO | WO 03/002489 | 1/2003 |
| WO | WO 03/078358 | 9/2003 |
| WO | 2005056872 | 6/2005 |
| WO | WO 2005/056872 | 6/2005 |
| WO | 2005082535 | 9/2005 |
| WO | WO 2005/082535 | 9/2005 |

OTHER PUBLICATIONS

Sheila H. Dewitt, Microreactors for Chemical Synthesis, Chemical Biology, 1999, 350-356.

Stephen J. Haswell, The Application of Micro Reactors to Synthetic Chemistry, The Royal Society of Chemistry, Feb. 5, 2001, 391-398.

Ann M. Thayer, Harnessing Microreactors, Chemical and Engineering News, May 30, 2005, 43-52, vol. 83, No. 22.

Advion, Triversa for Metabolite Identification, (2 pages).

Amin et al., "Peak Parking Technique for the Simultaneous Determination of Anions and Cations", Anal Bioanal Chem. 381:1426-1431, 2005.

Bodnar et al., "Exploiting the Complementary Nature of LC/MALDI/MS/MS and LC/ESI/MS/MS for Increased Proteome Coverage", J Am Soc Mass Spectrom 14:971-979, 2003.

Davis et al., "Low Flow High-Performance Liquid Chromatography Solvent Delivery System Designed for Tandem Capillary Liquid Chromatography-Mass Spectrometry", J Am Soc Mass Spectrom 6:571-577, 1995.

Davis et al., "Variable Flow Liquid Chromatography-Tandem Mass Spectrometry and the Comprehensive Analysis of Complex Protein Digest Mixtures", J Am Soc Mass Spectrom 8:1059-1069, 1997.

Dewitt, "Microreactors for chemical synthesis," Current Opinion in Chemical Biology, 1999, 3:350-356.

Dionex, Probot Microfraction Collector, (4 pages).

Eksigent, "The Eksigent NanoLC System for Proteomics", www.eksigent.com, (5 pages).

Geromanos et al., "Tuning of an Electrospray Ionization Source for Maximum Peptide-Ion Transmission into a Mass Spectrometer", Anal. Chem. 72:777-790, 2000.

Gillies et al., J. Label. Compds. Radiopharm., 42, (1999) S886-S888.

Goodlett et al., "Proteomics Without Polyacrylamide: Qualitative and Quantitative Uses of Tandem Mass Spectrometry in Proteome Analysis", Funct Integr Genomics 2:138-153, 2002.

Hadd et al., "Microchip Device for Performing Enzyme Assays," Anal. Chem. 1997, 67, 3407-3412.

Haswell et al., "Chemical and Biochemical Microreactors," The Royal Society of Chemistry 2001, Chem. Comm. 2001, 391-398.

Haswell et al., "The Application of Micro Reactors to Synthetic Chemistry," Chemical Communications, 2001, 391-398.

Jensen, "The Impact of MEMS on the Chemical and Pharmaceutical Industries," Solid-State Sensor and Actuator Workshop, So. Carolina, Jun. 4-8, 2000, 105-110.

Kammerer et al., "Achiral-chiral LC/LC—MS/MS Coupling for Determination of Chiral Discrimination Effects in Phenprocoumon Metabolism", Anal. Biochem. 339:297-309, 2005.

LC Packings, From the Leaders in Capillary LC, "LC/MS Tools", www.lcpakings.com, (16 pages).

Lin et al., "Peak Parking Using a Finnigan™ LCQ™ Deca", Thermo Electron Corporation, PSB 107, (2 pages).

Liu et al., "Enzyme Conformational Dynamics During Catalysis and in the 'Resting State' Monitored by Hydrogen/Deuterium Exchange Mass Spectrometry", FEBS Letters 580:5137-5142, 2006.

Lu et al., "A New Approach for Sequencing Human IRS1 Phosphotyrosine-Containing Peptides cro, Using CapLC-Q-TOF$^{micro}$", J Mass Spectrometry 40:599-607, 2005.

Lund et al., "Comparison of Peak Parking Versus Automated Fraction Analysis of a Complex Protein Mixture", Waters, PosterREPRINT, (6 pages).

Martin et al., "Subfemtomole MS and MS/MS Peptide Sequence Analysis Using Nano-HPLC Micro-ESI Fourier Transform Ion Cyclotron Resonance Mass Spectrometry", Anal. Chem. 72:4266-4274, 2000.

Miyabe et al., "A Kinetic Parameter Concerning Mass Transfer in Silica Monolithic and Particulate Stationary Phases Measured by the Peak-Parking and Slow-Elution Methods", J. Sep. Sci. 29:2452-2462, 2006.

Okamoto et al., "On-line Sample Enrichment System Coupled to Electrospray Ionization Time-of-Flight Mass Spectrometry (ESI-TOF-MS)", J of Pharmaceutical and Biomedical Analysis 41:707-713, 2006.

Opiteck et al., "Comprehensive On-Line LC/LC/MS of Proteins", Anal. Chem. 69:1518-1524, 1997.

Pan et al., "Folding Kinetics of the S100A11 Protein Dimer Studied by Time-Resolved Electrospray Mass Spectrometry and Pulsed Hydrogen-Deuterium Exchange", Biochemistry 45:3005-3013, 2006.

Patterson et al., "Interfacing Capillary/Nano LC with MALDI/MS for High-Throughput Proteonmics", LC Packings, (1 page).

Prolexys Pharmaceuticals, Inc., "HySpec", (2 pages).

Ramsey, "Chemistry and Chemical Analysis on Microfabricated Devices," Chemical and Analytical Sciences Division, Jan. 28, 2004, Oak Ridge, TN.

Staack et al., "The Combination of Liquid Chromatography/Tandem Mass Spectrometry and Chip-Based Infusion for Improved Screening and Characterization of Drug Metabolites", Rapid Commun. Mass Spectrom. 19:618-626, 2005.

Strittmatter et al., "Proteome Analyses Using Accurate Mass and Elution Time Peptide Tags with Capillary LC Time-of-Flight Mass Spectrometry", J Am Soc Mass Spectrom 14:980-991, 2003.

Vissers et al., "A Novel Interface for Variable Flow Nanoscale LC/MS/MS for Improved Proteome Coverage", J Am Soc Mass Spectrom 13:760-771, 2002.

Washburn et al., "Large-scale Analysis of the Yeast Proteome by Multidimensional Protein Identification Technology", Nature Biotechnology, hhtp://biotech.nature.com, 19:242-247, 2001.

Wilm et al., "Analytical Properties of the Nanoelectrospray Ion Source", Analytical Chemistry 68:1-8, 1996.

Zeller et al., "the Impact of Chromatography and Mass Spectrometry on the Analysis of Protein Phosphorylation Sites", Anal Bioannal Chem 378:898-909, 2004.

Zhou et al., "Quasi-linear Gradients for Capillary Liquid Chromatography with Mass and Tandem Mass Spectrometry", Rapid Commun. Mass Spectrom 14:432-438, 2000.

* cited by examiner

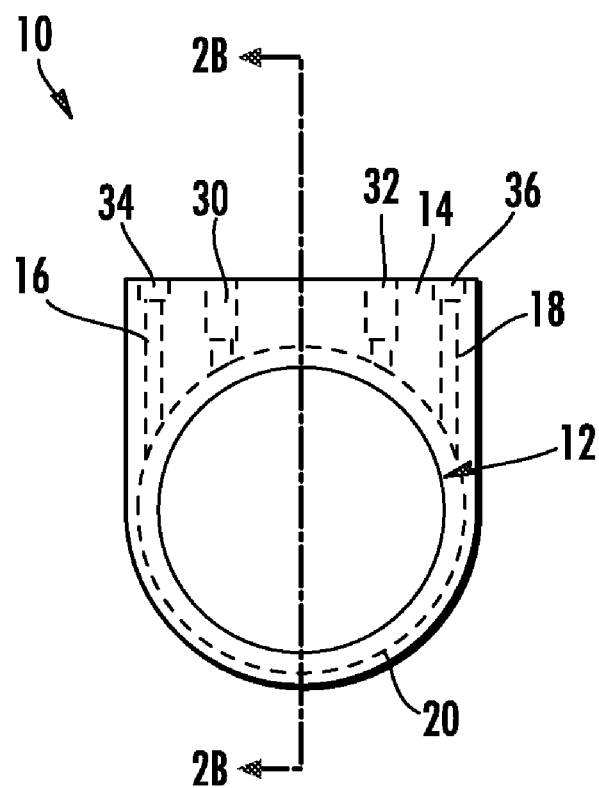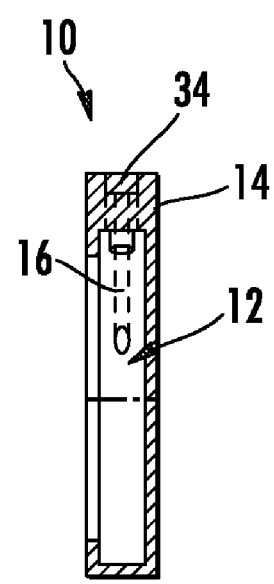
FIG. 2A
FIG. 2B

MODULAR AND RECONFIGURABLE MULTI-STAGE HIGH TEMPERATURE MICROREACTOR CARTRIDGE APPARATUS AND SYSTEM FOR USING SAME

CROSS REFERENCE TO RELATED APPLICATION

This patent application claims priority from and is related to U.S. Provisional Patent Application Ser. No. 60/823,303 filed Aug. 23, 2006, entitled: "Modular and Reconfigurable Multi-Stage High Temperature Microreactor Cartridge Apparatus and System for Using Same". This U.S. Provisional Patent Application is incorporated by reference in its entirety herein.

FIELD

This invention relates to the field of microfluidic chemical reactions and analyses of the same. More particularly, this invention relates to a modular and reconfigurable multi-stage high temperature microreactor cartridge apparatus and system for using the same.

BACKGROUND AND SUMMARY

Microfluidics has long been used to manipulate fluids in channels with height and width that typically range from 1 to 500 micrometers. Fluids are moved in volumes of nanoliters or microliters. "Lab-on-a-chip" technology has used microfluidics to perform chemical reactions and analyses at very high speeds while consuming small amounts of starting materials. Various chemical reactions require difficult conditions such as high pressure and high temperatures. Microfluidic systems use miniaturized reactors, mixers, heat exchangers, and other processing elements for performing chemical reactions on a miniature scale. Such systems are useful for reactions such as pharmaceutical or laboratory reactions where very small and accurate amounts of chemicals are necessary to successfully arrive at a desired product. Furthermore, use of microfluidic systems increases efficiency by reducing diffusion times and the need for excess reagents.

Applications for microfluidic systems are generally broad, but commercial success has been slow to develop in part because microfluidic devices are difficult and costly to produce. Another significant hurdle in microfluidics is addressing the macroscale to microscale interface. Other considerable problems include clogging of the systems, fouling of the reagent in the system, and supplying new reagent once the previous supply is depleted, clogged, or fouled. Furthermore, waste accumulations and air bubbles interfere with proper microfluidic system operation. Also, some reaction applications require extremely high temperature reactors, which have previously been unavailable in micro- and nanoscale devices. Thus, there is a need for a low cost solution for microfluidic systems. Preferably, but not necessarily, such solution would allow easy replacement of reagent once its supply is depleted, clogged, or fouled, and allow for remotely flushing waste and air bubbles from a microfluidic system in order to minimize losses of costly reagent. Also, such solution would preferably be capable of extremely high temperature use at or above five hundred (500) degrees Celsius.

The above and other needs are met by a modular and reconfigurable multi-stage high temperature microreactor cartridge apparatus and system for using the same. The cartridge is connected to a fluidic system for reacting one or more reagents at temperatures ranging above about five hundred (500) degrees Celsius and produces one or more products. The cartridge includes a plurality of cartridge ports each for receiving fluid from the fluidic system or supplying fluid to the fluidic system. The cartridge also includes small bore tubing having an inner diameter of about one to about twenty-five hundred micrometers. The small bore tubing has a first transport portion connected to a first one of the plurality of cartridge ports, a second transport portion connected to a second one of the plurality of cartridge ports and a body portion for connecting the first transport portion to the second transport portion, the body portion wound substantially in the shape of a coil wherein the first transport portion and the second transport portion are disposed in substantially parallel planes to a plane defined by at least one turn of the coil. Finally, in some embodiments, the cartridge includes a housing substantially surrounding at least the body portion of the small bore tubing for protecting the small bore tubing and regulating heat exchange to and from the small bore tubing in order to facilitate reaction of the one or more reagents producing one or more products.

In some embodiments, the small bore tubing is microfluidic tubing having an inner diameter of about one to about five hundred micrometers. In some embodiments, the small bore tubing is glass capillary tubing and the housing is either ceramic, metal, glass or some other material.

A method produces one or more radioactive products with a fluidic system using the cartridge described above. The method includes providing one or more reagents, reacting a first reagent of the one or more reagents in the coil of the cartridge at temperatures above about five hundred (500) degrees Celsius producing one or more streams of products, and separating the one or more radioactive products from the one or more streams of products. In some embodiments, the one or more radioactive products is a [C-11] labeled product. In some embodiments, the radioactive product is methyl-iodide. In yet other embodiments, the one or more of the radioactive products is reacted with a second reagent of the one or more reagents in a methylation reaction to produce a final product, which, in some embodiments, is a pharmaceutical product. In some embodiments, the temperature of the coil of the cartridge is about seven hundred and twenty (720) degrees Celsius.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIGS. 2A, 2B, and 2C are schematics of the microfluidic reactor cartridge from various viewpoints.

DETAILED DESCRIPTION

Figure 1:
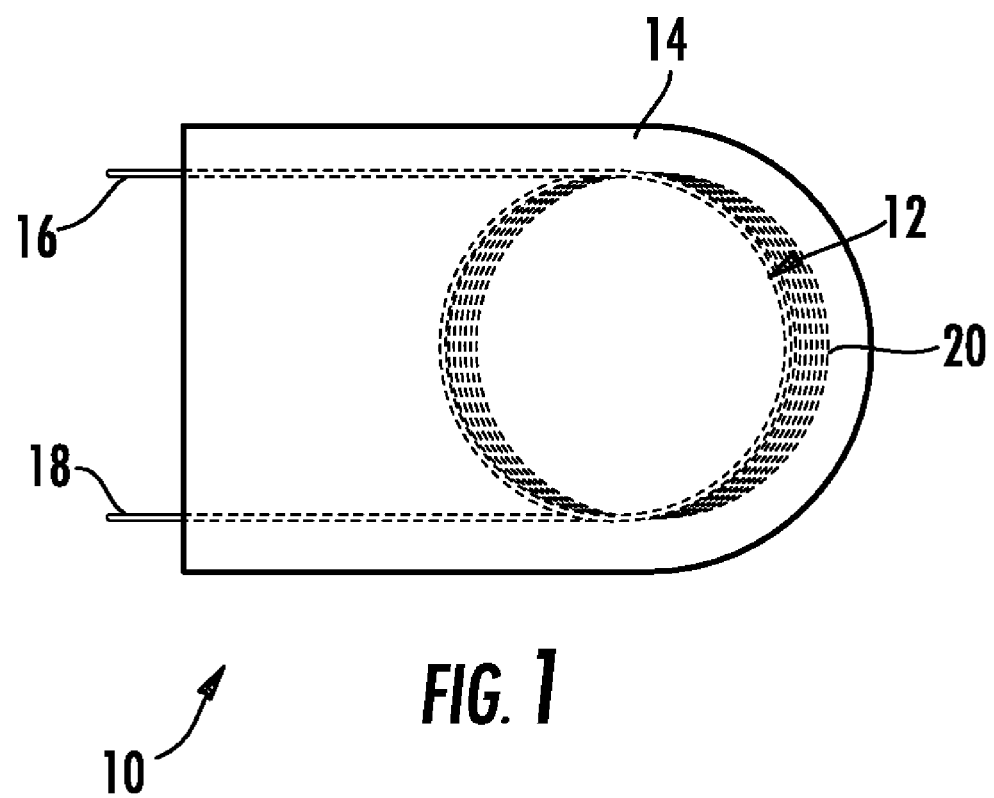
FIG. 1 is a diagram of a microfluidic reactor cartridge.

Referring to FIG. 1, a microfluidic reactor cartridge 10 is shown. The cartridge has a coil of capillary tubing 12 having a first transport portion 16, a spool portion 20, and a second transport portion 18. The coil 12 is surrounded by a housing 14 capable of withstanding high temperatures and the housing 14 functions in part as an external spool for holding, protecting and heating the spool portion 20 of the tubing 12. In one embodiment the coil 12 is made of glass, and the housing 14 is made of high temperature materials. For example, appropriate materials for the housing are: nickel, quartz glass, and ceramic. The microfluidic reactor cartridge 10 may be used as a high temperature gas reactor, such as below regarding the method for making methyl iodide (FIG. 4). The coil 12 is small bore capillary tubing in the range of 1 to 2500 micrometers in diameter and a maximum length of several meters. Further, a cross-section of the capillary tubing may be any shape, but preferably is circular.

To make the microfluidic reactor cartridge 10, glass capillary tubing is coiled into a coil 12 and subsequently placed inside a high temperature housing 14. Typically, glass capillary tubing is encased in Kapton insulation to protect the glass from scratches and to increase its durability. The Kapton insulation is burned off the glass capillary tubing in a pre-firing. Preferably, the glass capillary tubing is fused silica quartz tubing.

In some embodiments, the tubing of the coil 12 ranges in diameter from about one (1) to about twenty-five hundred (2500) micrometers. The housing 14, in some embodiments, is substantially the shape of a cylindrical prism having a solid center portion. Whereas, in other embodiments, the housing 14 is similar to the shape of a doughnut or toroid having either a smooth surface or having a cornered, boxed surface. In other words, the housing 14 completely surrounds the coil 12 but is devoid of a central area.

Figure 2C:
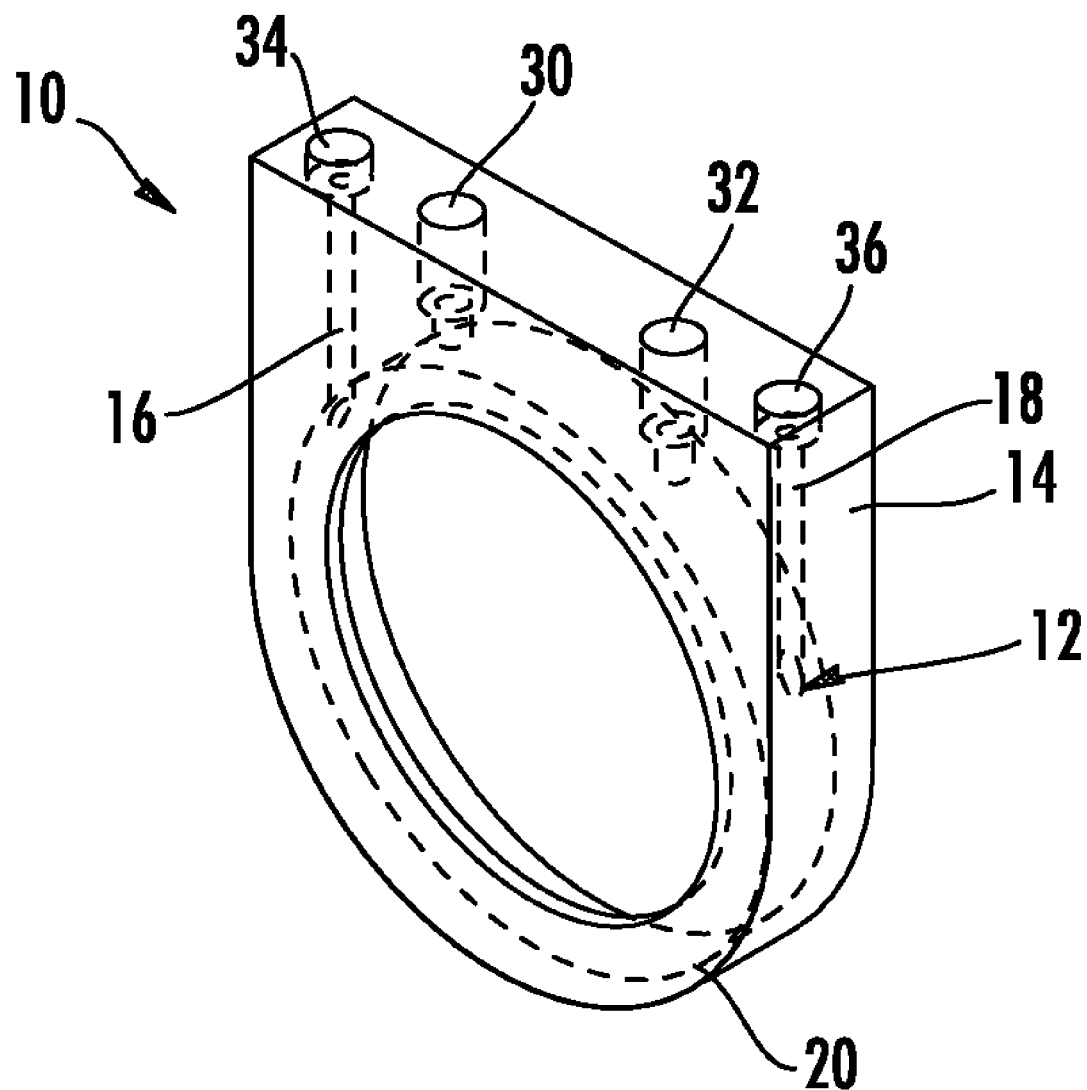

Referring now to FIGS. 2A, 2B, and 2C, schematic diagrams of a microfluidic reactor cartridge 10 are shown from various viewpoints. The first transport portion 16 of the coil 12 terminates at a first cartridge port 34, and the second transport portion 18 of the coil 12 terminates at a second cartridge port 36. The first and second cartridge ports 34 and 36 allow the microfluidic reactor cartridge 10 to be connected to tubing or circuitry in a larger microfluidic system. The first and second attachment apertures 30 and 32 provide a securing mechanism for the microfluidic reactor cartridge 10 to be attached to a larger microfluidic system. In some embodiments, the transport portions 16 and 18 are substantially parallel to the turns of the coil 12. In other words, the turns of the coil 12 are very closely spaced with one another such that the coil 12 resembles a retracted spring rather as opposed to an extended spring. In some embodiments, the distance between two turns or levels of the coil 12 is between about zero (0) and about twenty-five hundred (2500) micrometers. This distance is referred to as the coil level distance.

Referring now to FIGS. 3A, 3B, 3C, and 3D, another embodiment of the microfluidic reactor cartridge, the serpentine reactor cartridge 40 is shown. As opposed to the coil 12 of the microfluidic reactor cartridge 10 discussed above, the serpentine reactor cartridge 40 has a serpentine microreactor 42 formed in a housing 44, which may be ceramic, quartz, nickel, or any other high-temperature material. Preferably, the serpentine microreactor 42 is capable of high temperature operation. In the preferred embodiment, the serpentine reactor 42 may include the capillary tubing described above or may be defined by channels etched in a ceramic housing. As used herein with reference to the serpentine microreactor 42, "microfluidic tubing" is used to refer to the channel or tubing forming the serpentine microreactor 42. The serpentine reactor cartridge 40 is typically made by using a microfabricated serpentine reactor channel etched in a ceramic housing 44. An inlet tube 46 is attached to the serpentine microreactor 42 at an inlet port 48 of the serpentine microreactor 42, and an outlet tube 50 is attached to the serpentine microreactor 42 at an outlet port 52 of the serpentine microreactor 42. The inner diameter 54 of the microfluidic tubing in the serpentine microreactor 42 is significantly smaller than the inner diameter 56 of the macrofluidic tubing in the inlet and outlet tubes 46 and 50. For example, in the embodiment shown in FIG. 3D, the inner diameter 54 of the microfluidic tubing of the serpentine microreactor 42 is about 0.152 millimeters, whereas the inner diameter 56 of the macrofluidic tubing of the inlet and outlet tubes 46 and 50 is about five (5) millimeters. In the preferred embodiment, the inlet tube and the outlet tube are quartz tubes.

Figure 3A:
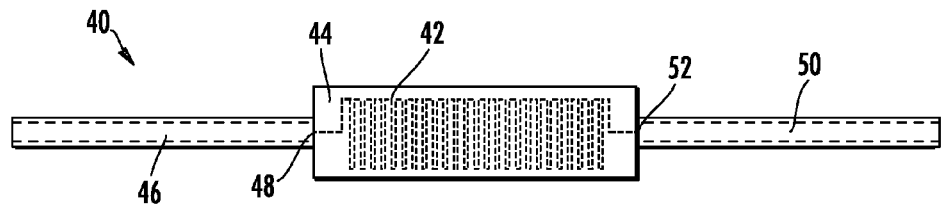
FIGS. 3A, 3B, 3C, and 3D are schematics of a serpentine reactor cartridge from various viewpoints.
Figure 3B:
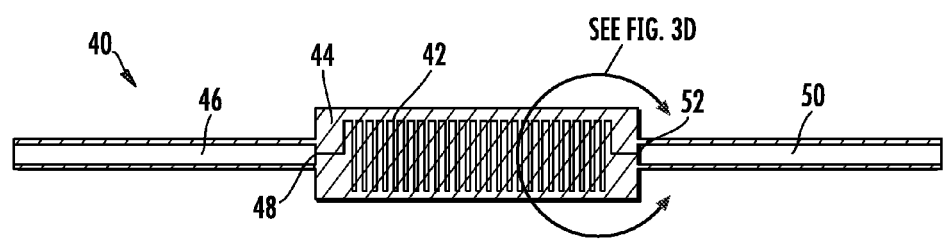
Figure 3C:
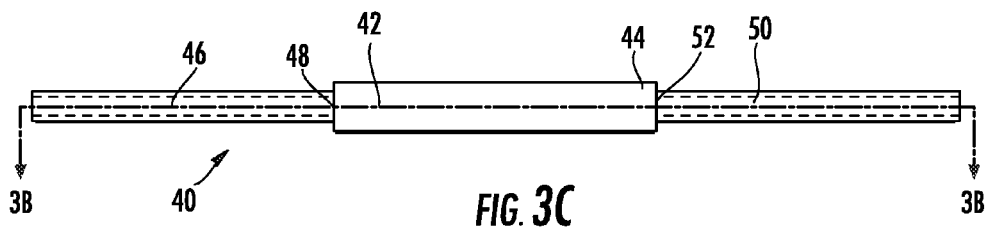
Figure 3D:
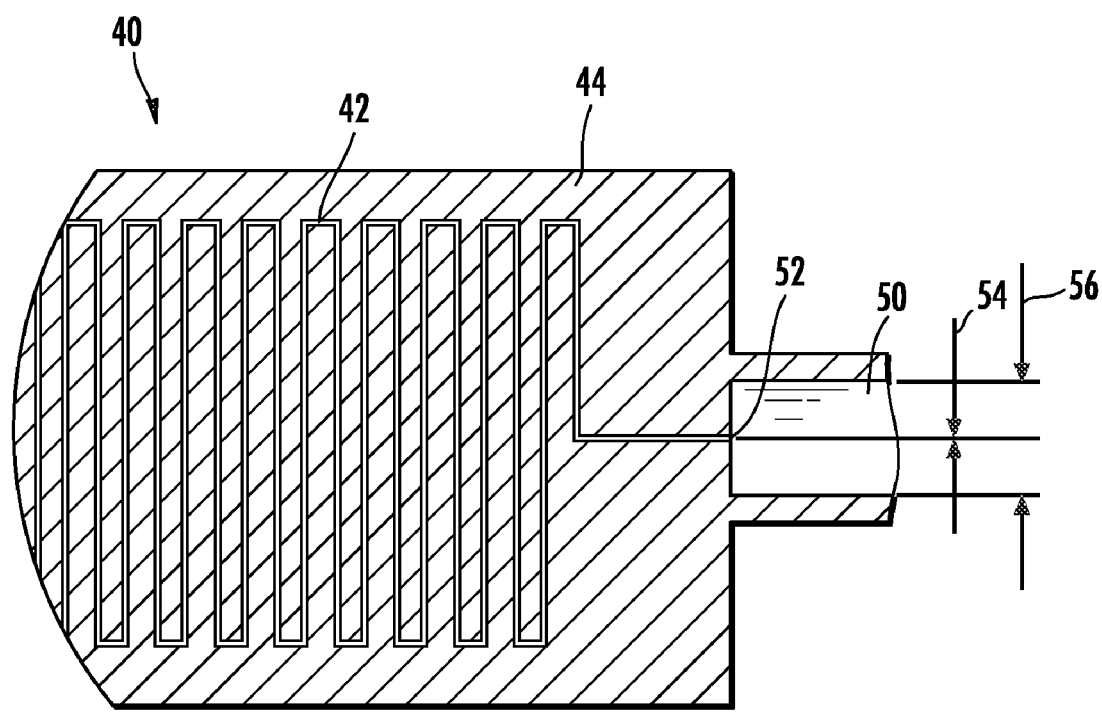

In some embodiments, the cross-section of the microfluidic tubing in the serpentine microreactor 42 is rectangular or other shapes, such as the embodiment of FIG. 3D, wherein a rectangular microfluidic channel has cross-sectional dimensions of 0.152 millimeters by 0.050 millimeters. The micro/macro interface and the macro/micro interface of the serpentine reactor cartridge 40 may be used in many reactions requiring solid to gas reactions and resolidification of some reactants. The inner diameters of the inlet tube 46 and the outlet tube 50 provide sufficient space for holding solids for reacting and resolidification or recrystallization of unused reactants once they exit the serpentine microreactor 42. For example, one reaction requires iodine gas, which is produced by pre-heating iodine crystals in the inlet tube 46. Iodine gas is emitted and funneled into the serpentine microreactor 42 for reaction with one or more other gases. For example, in one reaction, the iodine gas is reacted with [C-11] labeled methane gas (radioactive) in the serpentine microreactor 42. The outlet tube 50 then collects the unused iodine gas as it recrystallizes.

To make the serpentine reactor cartridge 40 such as by etching, a high temperature housing is provided and, a serpentine channel is formed in the reactor housing using one of several microfabrication techniques such as wet etching, reactive ion etching, or thin layer composite stacking The inlet and outlet tubes are attached at the inlet and outlet ports respectively.

Figure 4A:
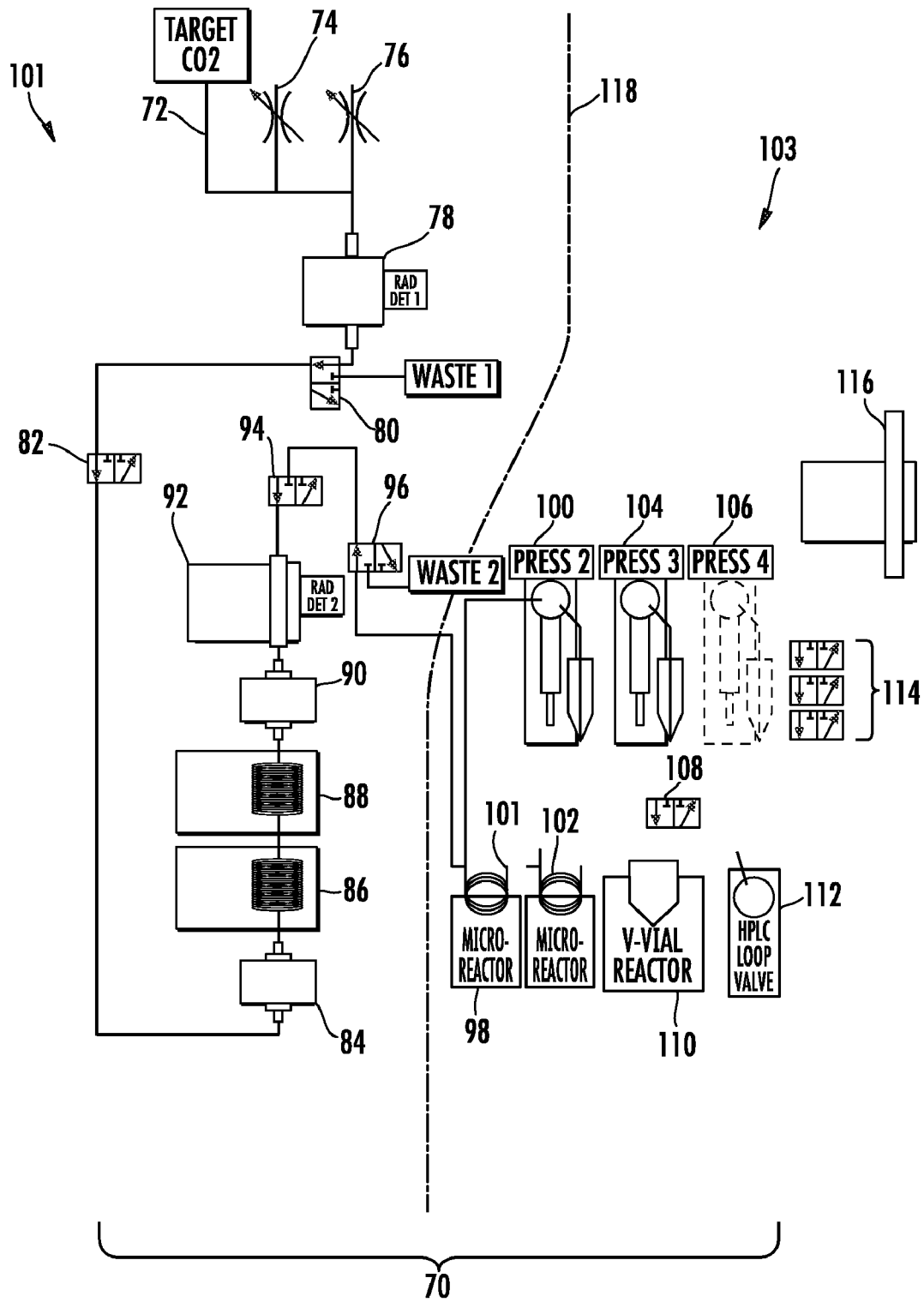
FIG. 4A is a diagram of a reactor system.

The microfluidic reactor cartridge 10 and the serpentine reactor cartridge 40 may be used in a reaction system 70 such as that shown in FIG. 4A. The reaction system 70 shown in FIG. 4A can produce [11-C] radioactive labeled compounds faster and more efficiently than conventional macroscale devices. The high temperature microreactor cartridges 10 and 40 facilitate performing a gas phase reaction at process temperatures above 500° C. and a typical process temperature would be about 720 degree Celsius. Previously, such high temperature reactions were not attempted with micro reactors. The incorporation of a high temperature microreactor 10 or 40 in a gas phase [11-C] synthesis system for producing positron emission tomography (PET) labeled products is shown in the reaction system 70 of FIG. 4A. The microreactor cartridges 10 and 40 are capable of operating at a range of processing temperatures from ambient temperature to about 900° C., and most advantageously at high process temperatures around 720° C.

Referring now to FIG. 4A, a carbon dioxide supply 72, a hydrogen supply 74, and a helium supply 76 are connected in parallel to a sieve 78. The sieve 78 is connected to a waste process valve 80, which is connected to an input repeat process valve 82. The repeat process valve 82 is connected to a filter 84, which is connected to a first heater 86. The first heater 86 is connected to a second microfluidic reactor cartridge 88. Preferably, the first heater 86 is not a high-temperature reactor, and the second microfluidic reactor cartridge 88 is a high temperature ceramic reactor with a coil 12 as discussed above. The second microfluidic reactor cartridge is connected to a second filter 90, which is connected to a PORPAK 92. The PORPAK 92 is connected to an output repeat process valve 94, which is connected to a second waste process valve 96. Next, a microfluidic reactor cartridge 98 is connected to the second waste process valve 96 and a first reagent supply 100. Additionally, another microfluidic reactor cartridge 102 connected to another reagent supply 104 may be connected to the output 101 of the reaction system 70. Other optional reaction system 70 components include a third reagent supply 106, another process valve 108, a v-vial reactor 110, an HPLC loop valve 112, several spare inert process valves 114, and a triflate high temperature heater 116.

Referring to the left-hand side of FIG. 4A, as divided by dotted line 118, the first phase 101 of the reaction system begins at the supplies 72, 74, and 76. The hydrogen supply 74 and the helium supply 76 are used to condition the sieve 78, which also functions as a furnace. The sieve 78 traps and collects the carbon dioxide, which includes radioactive [C-11] carbon, as it flows from the carbon dioxide supply 72. This step is sometimes referred to as trapping the target product. In other embodiments, the product is targeted by using a liquid nitrogen trap. Next, the heater is activated producing [C-11] methane gas, which is the product of [C-11] carbon dioxide and nickel hydride (NiH).

The input repeat valve, which is connected to the first filter 84, and the input repeat valve 82 and the output repeat valve 94 are discussed in further detail below. The first filter 84 scrubs out the remaining, unreactive carbon dioxide. Then the first heater 86 warms a reactant such as iodine, if necessary, in order to create iodine gas for combination and reaction with the methane gas. The first heater 86 may be a separate tube or may be the inlet tube 46 of a serpentine reactor cartridge 40 (FIG. 3). Next, a high temperature reactor such as a microfluidic reactor cartridge 10 (FIGS. 1-2) or a serpentine microreactor 42 (FIG. 3) is used to heat the reactants, methane gas and iodine gas in this example, to temperatures of about 720 degrees Celsius. Next, the filter 90 removes any unwanted, unreacted methane or iodine. The filter 90 may be an outlet tube 50 of the serpentine reactor cartridge 40 (FIG. 3) or may be another type of filter. In this example, the unused iodine gas is recrystallized in the outlet tube 50, which as discussed above, has sufficient area for the recrystallization. In this case, a glass tube having an inside diameter of 7.75 mm is used. Then the PORPAK 92 collects methyl iodide out of the stream.

In other embodiments, output process valve 94 is connected to input process valve 82 and a recirculation pump is used to re-circulate un-reacted methane gas through the first phase components 84, 86, 88, 90, and 92 discussed above. However, when utilizing the high temperature microfluidic reactors 10 and 40, shown in FIG. 4A as 88, the diffusion distance is significantly reduced and the reactor length is significantly increased achieving high single pass yields. In previous systems, fifty or sixty reiterations of the reaction process were used in order to produce methyl iodide yields of about 50%. Unfortunately, the half-life of [C-11] is about twenty minutes, and the reiterations of the reaction took about five to seven minutes. Thus, the overall efficiency of previous systems may be greatly increased by using small, more highly reactive environments such as microfluidic channels and tubing at very high temperatures.

Referring now to the second phase 103 of the reaction system 70, which is shown on the right-hand side of dotted line 118, a methylation reaction is illustrated. A methylation reaction uses methyl-iodide, in this example, to make a final pharmaceutical product. This is done by reacting the [C-11] methane group with further reagents contained in reagent supply 100 and reagent supplies 104 and 106 if necessary. In the referred embodiment, these reactions may be done in a microfluidic reactor cartridge such as 98 and 102, which are described in applications entitled "Modular and Reconfigurable Multi-Stage Microreactor Cartridge Apparatus," Ser. No. 11/421,678 and "Cartridge Based Fluid Loading System for Micro and Nano-Scale Fluidic Devices," Ser. No. 11/280,116. In other embodiments, a microbubbler, described in application entitled "Evaporator And Condenser," Ser. No. 60/803,660 is used to dissolve the methyl iodide gas into a chilled solvent. The solvent mixture is then heated and reacted. This reaction system 70 may be used for a variety of substance and compound production including pharmaceutical drugs requiring radioactive reactants.

Figure 4B:
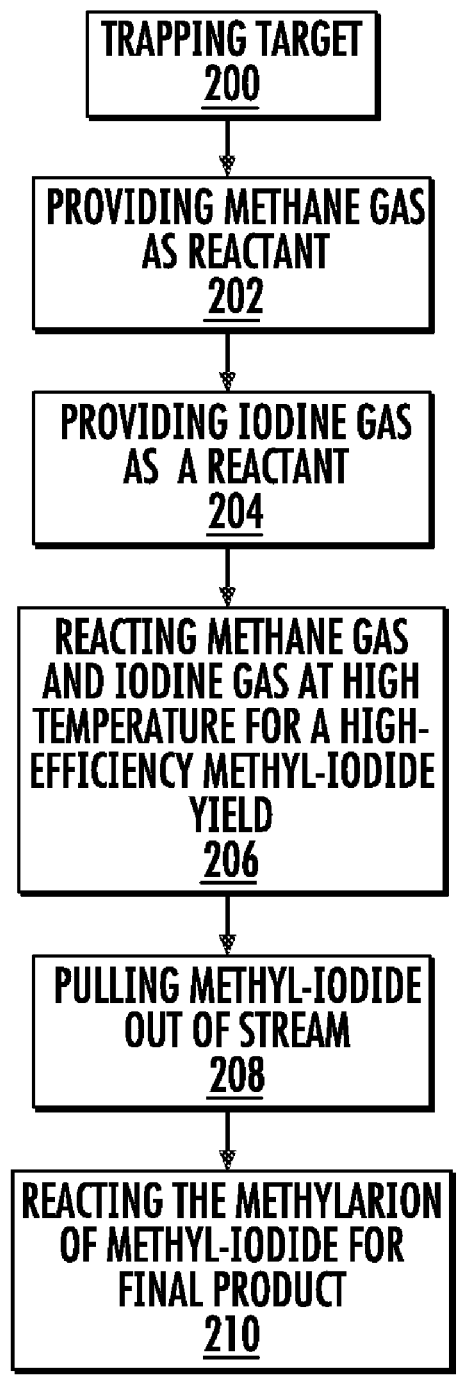
FIG. 4B is a flowchart of a method for making a reactive product using a high temperature reactor cartridge.

The method for making methyl-iodide discussed above is further illustrated with reference to FIG. 4B. First the target is trapped 200, and then the two reactants, methane gas and iodine gas are provided, as represented by steps 202 and 204 respectively. Then the methane gas and the iodine gas are reacted at very high temperatures for a high-efficiency methyl-iodine yield. Next, the methyl-iodine is pulled from the product stream 208. In some embodiments, the methyl-iodine is used in a second phase 103 (FIG. 4A) methylation reaction resulting in a final product 210 such as a pharmaceutical product.

Figure 5:
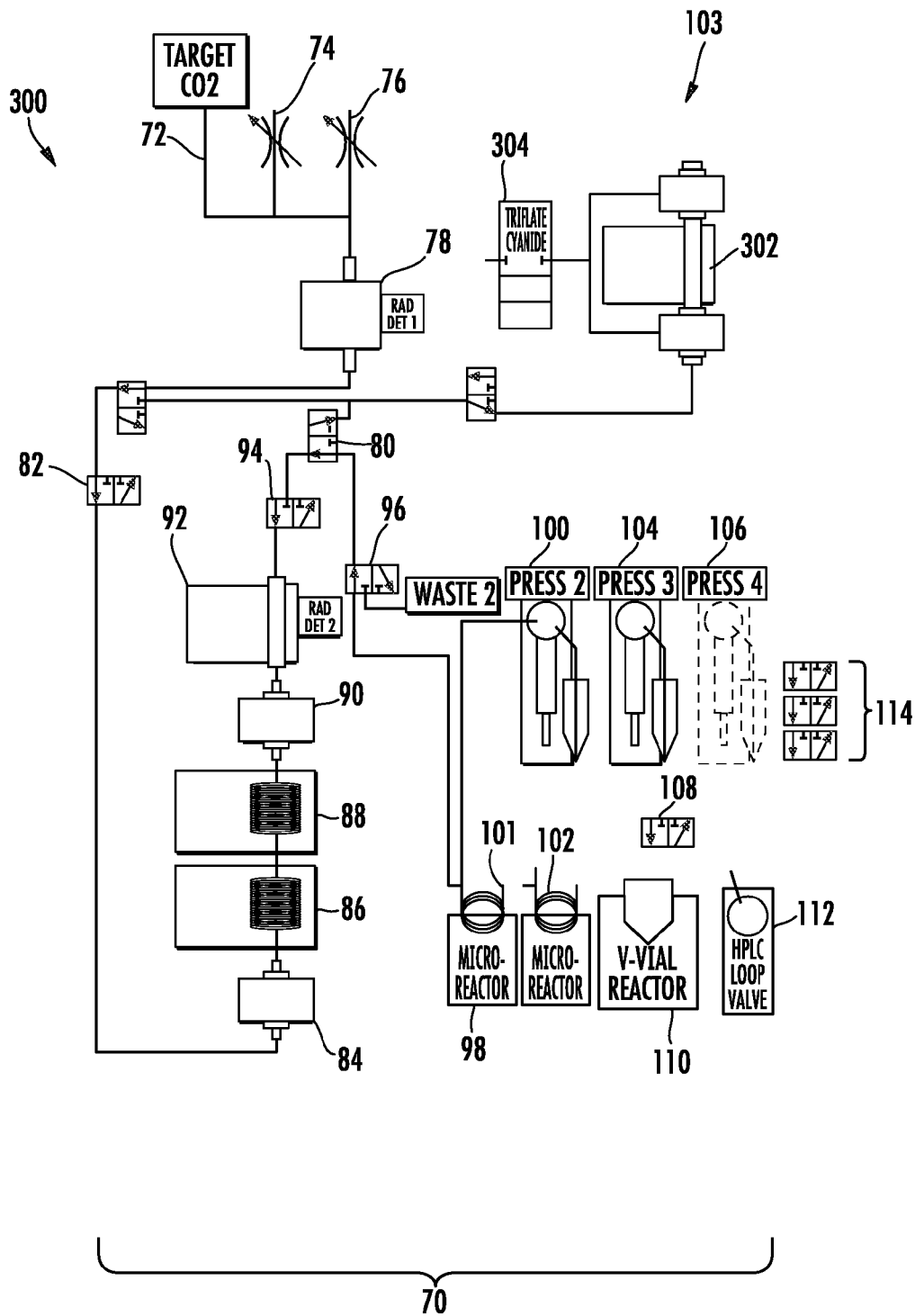
FIG. 5 is a diagram of another embodiment of a reactor system.

Referring now to FIG. 5, another embodiment of a reactor system 300 is shown. In this embodiment, an additional high-temperature reactor 302 is connected to the reactor system in order to input triflate cyanide 304. This configuration is used to produce methyl triflate and hydrogen cyanide.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A cartridge configured to be connected to a fluidic system for reacting one or more reagents to produce one or more products, the cartridge comprising:
   a plurality of cartridge ports;
   a. a coiled capillary tubing wound substantially in the shape of a coil and having a coil level distance of from about zero to about twenty-five hundred micrometers and with at least a plurality of the coils formed by the coiled capillary tubing having the same diameter, the coiled capillary being formed from tubing having an inner diameter of about one (1) to about twenty-five hundred (2500) micrometers, the coiled capillary having an inlet and an outlet;
      i. a first transport portion connected to a first one the plurality of cartridge ports and to the inlet to the coiled capillary;
      ii. a second transport portion connected to a second one of the plurality of cartridge ports and to the outlet from the coiled capillary;

b. a housing having an inside surface surrounding at least a portion of the coiled capillary tubing such that the coiled capillary tubing is at least partially held by the inside surface of the housing.

2. The cartridge of claim 1 wherein the tubing comprises fused silica.

3. The cartridge of claim 1 wherein the tubing comprises microfluidic tubing having an inner diameter of about one (1) to about five hundred (500) micrometers.

4. The cartridge of claim 1 wherein the housing is comprised of ceramic.

5. The cartridge of claim 1 wherein the housing is comprised of metal.

6. The cartridge of claim 1 wherein the housing is comprised of fused silica.

7. The cartridge of claim 1, wherein the body portion of the tubing has an inner diameter ranging from about one (1) to about twenty-five hundred (2500) micrometers.

8. The cartridge of claim 1, wherein the body portion of the tubing has a coil level distance ranging from about one (1) to about twenty-five hundred (2500) micrometers.

9. A cartridge configured to be connected to a fluidic system for reacting one or more reagents producing one or more products, the cartridge comprising:
 a. a body portion of small bore tubing including an inlet and an exit and having an inner diameter of about one to about twenty-five hundred micrometers, the body portion wound in the shape of a coil with at least a plurality of the coils formed by the body portion having the same diameter and having a coil level distance of from about zero to about twenty-five hundred micrometers;
 a plurality of cartridge ports including at least an inlet port and an outlet port means for receiving fluid from the fluidic system and providing the fluid to the body portion of small bore tubing; wherein:
  the inlet port is disposed along a first axis, the body portion is coiled around a second axis, and the outlet port is disposed along a third axis;
  the first axis of the inlet port and third axis of the outlet port being substantially in parallel;
  the second axis of the body portion being substantially parallel to the plane of the fluidic system and not in parallel with the first axis and the third axis; and
  the first axis and the third axis being disposed in planes substantially perpendicular to a plane of the fluidic system;
 b. a housing having an inside surface surrounding at least a portion of the body portion of the small bore tubing such that the coiled capillary tubing is at least partially held by the inside surface of the housing; and
 c. a device configured to facilitate heat exchange to and from the body portion of small bore tubing to aid in reacting the one or more reagents producing one or more products; and
 d. a supply device configured to supply the one or more products to the fluidic system.

10. The cartridge of claim 1, wherein:
 the first transport portion is disposed along a first axis, the coiled capillary is coiled around a second axis, and the second transport portion is disposed along a third axis;
 the first axis of the first transport portion and third axis of the second transport portion being substantially in parallel;
 the second axis of the body portion being substantially parallel to the plane of the fluidic system and not in parallel with the first axis and the third axis; and
 the first axis and the third axis being disposed in planes substantially perpendicular to a plane of the fluidic system.

11. The cartridge of claim 1 further comprising a heating device configured to heat the coiled capillary.

12. The cartridge of claim 1 further comprising a heating device configured to heat the coiled capillary to a temperatures above about five hundred (500) degrees Celsius.

13. The cartridge of claim 1 wherein the housing regulates heat exchange to and from the coiled capillary.

14. The cartridge of claim 1 wherein the coiled capillary tubing has a coil level distance of from about zero to about twenty-five hundred micrometers.

* * * * *

UNITED STATES PATENT AND TRADEMARK OFFICE
CERTIFICATE OF CORRECTION

PATENT NO.       : 7,854,902 B2  
APPLICATION NO.  : 11/843458  
DATED            : December 21, 2010  
INVENTOR(S)      : Joseph C. Matteo Page 1 of 1

It is certified that error appears in the above-identified patent and that said Letters Patent is hereby corrected as shown below:

Claim 1, Column 6, Line 62,– after "one" insert -- of --.

Claim 9, Column 8, Line 13, – after "reagents" insert -- and --.

Signed and Sealed this  
Twenty-ninth Day of March, 2011

David J. Kappos  
*Director of the United States Patent and Trademark Office*